US006891543B2

(12) United States Patent
Wyatt

(10) Patent No.: US 6,891,543 B2
(45) Date of Patent: May 10, 2005

(54) METHOD AND SYSTEM FOR OPTIMALLY SHARING MEMORY BETWEEN A HOST PROCESSOR AND GRAPHICS PROCESSOR

(75) Inventor: David A. Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 10/140,263

(22) Filed: May 8, 2002

(65) Prior Publication Data

US 2003/0210248 A1 Nov. 13, 2003

(51) Int. Cl.$^7$ .............................................. G06F 1/167
(52) U.S. Cl. ..................... 345/541; 345/557; 345/543
(58) Field of Search ................................ 345/541–544, 345/501, 557, 519; 711/118, 130, 131, 141, 147, 149, 151, 153, 170–173, 137

(56) References Cited

U.S. PATENT DOCUMENTS

| | | | | |
|---|---|---|---|---|
| 5,557,733 A | * | 9/1996 | Hicok et al. ................. | 345/554 |
| 5,706,407 A | * | 1/1998 | Nakamura et al. ........... | 711/172 |
| 5,941,968 A | * | 8/1999 | Mergard et al. ............. | 711/146 |
| 6,052,133 A | * | 4/2000 | Kang .......................... | 345/532 |
| 6,141,021 A | * | 10/2000 | Bickford et al. ............. | 345/503 |
| 6,483,516 B1 | * | 11/2002 | Tischler ...................... | 345/552 |
| 6,631,447 B1 | * | 10/2003 | Morioka et al. ............. | 711/141 |
| 6,665,775 B1 | * | 12/2003 | Maiyuran et al. ........... | 711/129 |
| 6,728,839 B1 | * | 4/2004 | Marshall ..................... | 711/137 |
| 2003/0131178 A1 | * | 7/2003 | Huang et al. ................ | 710/315 |

FOREIGN PATENT DOCUMENTS

| | | |
|---|---|---|
| EP | 1 059 587 | 12/2000 |
| GB | 2 331 379 | 5/1999 |

* cited by examiner

Primary Examiner—Kee M. Tung
(74) Attorney, Agent, or Firm—Kenyon & Kenyon

(57) ABSTRACT

A method and system according to the present invention provide for sharing memory between applications running on one or more CPUs, and acceleration co-processors, such as graphics processors, of a computer system in which the memory may retain its optimal caching and access attributes favorable to the maximum performance of both CPU and graphics processor. The method involves a division of ownership within which the shared memory is made coherent with respect to the previous owner, prior to handing placing the shared memory in the view the next owner. This arbitration may involve interfaces within which ownership is transitioned from one client to another. Within such transition of ownership the memory may be changed from one view to another by actively altering the processor caching attributes of the shared memory as well as via the use of processor low-level cache control instructions, and/or graphics processor render flush algorithms which serve to enforce data coherency. Embodiments of the invention facilitate maximal access efficiency for all clients which share the data, without the incurring the overhead of moving or replicating the data between the clients.

40 Claims, 11 Drawing Sheets

METHOD AND SYSTEM FOR OPTIMALLY SHARING MEMORY BETWEEN A HOST PROCESSOR AND GRAPHICS PROCESSOR

FIELD OF THE INVENTION

The present invention relates to computer graphics systems, and more particularly to optimizing the use of memory shared by a CPU (central processing unit) and a graphics processor.

BACKGROUND

In many known computer systems, a host CPU may execute an application which calls for graphics operations to be performed. To implement such graphics operations, the application will typically fetch initial graphics data and primitives (including, but not limited to, textures, geometry, models, etc.) from offline storage (including, but not limited to, network, CD or hard-drive disk storage) and create a copy of the graphics data and primitives in online system memory. The application may operate on the graphics pixels, data models and primitives in the online system memory and then, at some point, the application may call for a graphics processor of the computer system to operate on the graphics data and primitives, typically in order to offload low-level rendering tasks from the host CPU.

According to known implementations, when invoking operations by the graphics processor, the application will create a second copy, separate from the copy initially loaded into online system memory from offline storage, of the graphics data and primitives for the graphics processor to operate on. This second, separate copy (which may be referred to herein as an "aliased" copy) may typically be placed in a region of online system memory which may be referred to as "graphics memory" because it is set aside for use by the graphics processor. Various implementations of graphics memory are known in the art. For example, discrete add-in graphics adapter cards may contain graphics memory which is locally connected by a private memory bus on the card; this is typically referred to as "local video memory". In another example, in chipsets with the known Intel® Hub Architecture, a region of system memory designated Advanced Graphics Port (AGP) memory is used as graphics memory. AGP memory may also be referred to as "non-local video memory".

The graphics processor would typically operate on the aliased copy of the graphics data in the graphics memory for a period of time. Typically, the graphics memory containing the aliased copy of the graphics data would be assigned an uncached attribute in the host CPU's memory page attribute tables, meaning that application access to the graphics data would not take advantage of the host CPU's cache while that data was in this uncached graphics memory region to be processed by the graphics processor. After the uncached, aliased copy had been processed by the graphics processor for a period of time, it would typically be necessary to return to the application for further processing of the graphics data. According to the aforementioned implementation, however, the application operates on the copy of the graphics data in the system memory. This system memory would typically have been assigned a cached attribute, so that the CPU could perform the application's operations in a cached mode. As is well known, cached operations by a CPU allow the CPU to be more efficient than uncached operations.

In order for the application to continue operating on the graphics data after the graphics processor, of course, changes to the aliased copy made by the graphics processor need to be reflected in the copy in the system memory used by the application.

The application may continue to process the copy in the system memory for a period of time in cached mode, and then again turn processing over to the graphics processor. Naturally, changes to the copy in the system memory must be reflected in the aliased copy in the graphics memory when the graphics processor takes over again. The foregoing exchange between the application and the graphics processor may be repeated many times.

It may be appreciated that the foregoing arrangement entails disadvantages. One disadvantage is that two copies of the same graphics data must be maintained, consuming valuable system memory resources. Additionally, valuable CPU bandwidth is consumed in creating and maintaining the two separate copies, particularly in propagating respective updates between the two copies across buses between multiple interfaces.

Implementations which do not involve maintaining two copies of graphics data as described in the foregoing are known. According to one such implementation, cacheable system memory is made available to a graphics processor for use as graphics memory, and the graphics processor as well as the host CPU perform operations on graphics data in the graphics memory. As described previously, the graphics processor and the host CPU take turns operating on the graphics data. Because the memory is cacheable, the CPU is able to operate in cached mode for improved efficiency.

However, this approach introduces the possibility of data "incoherency". That is, because the CPU uses the graphics memory in cached mode, the data that the graphics processor has been asked to perform operations on may not yet have been flushed (i.e., evicted from the cache and written out to the graphics memory). Rather, the data may reside somewhere between the internals of the CPU and the L1 and L2 caches, and not have actually reached the graphics memory yet. Thus, when the graphics processor accesses the graphics memory to attempt to perform operations on the required data, it may not be able to find the most recent version of the required data. Instead, the data in the graphics memory may be "stale". Or worse, the data may be emptied from the cache, just after the graphics processor has completed accessing the data location, thereby invalidating the operation.

To handle the problem of incoherency, chipset "snoop cycles" have been utilized. Snoop cycles involve the graphics processor causing the chipset to force coherency in the CPU cache with respect to the graphics memory before the graphics processor is allowed to access the graphics memory. Snoop cycles, however, entail the disadvantage of requiring a considerable amount of overhead, which detracts from system performance. Snoop cycles inspect memory data on a location-by-location basis, and if the required location's data is still in the CPU's cache, it is extracted and made coherent on a location-by-location basis. Such operations require a great deal of "handshaking" between interfaces, and are inefficient because they must be performed on a location-by-location, or line-by-line basis.

According to yet another implementation, graphics memory is used strictly in uncached mode. In this method, the data in the graphics memory is always kept coherent, since whenever the CPU wishes to read or write data to the graphics memory, the writes always go directly and immediately to the graphics memory and are never cached. A disadvantage associated with this method, however, is that the improved CPU performance afforded by cached operations is not available.

In view of the foregoing considerations, a method and system are called for which overcome the deficiencies of existing implementations.

DETAILED DESCRIPTION

In embodiments of a method and system according to the present invention, an optimally shared graphics memory may be provided which has a caching attribute assigned depending on whether the optimally shared memory is to be used by a host CPU or by a graphics processor. The attribute assigned to the optimally shared memory is selected to be favorable to the performance of the CPU when the CPU is using the optimally shared memory, and favorable to the performance of the graphics processor when the graphics processor is using the optimally shared memory.

According to the embodiments, the assigned caching attribute of the optimally shared memory may be changed during a transition between a mode wherein a host CPU is using the optimally shared memory, and a mode wherein a graphics processor is using the optimally shared memory.

The attribute assigned to the optimally shared memory while the CPU is using it may be a cached attribute. Here, "cached attribute" means that, to enable operations by the CPU at its internal clock speed, portions of data destined for the optimally shared memory may first be transferred to and worked on in the CPU's cache. When a transition occurs to a mode wherein the graphics processor will work on the data in the optimally shared memory, the data in the CPU's cache may be made coherent, and the assigned caching attribute of the optimally shared memory may be changed to be an uncached attribute. Here, "uncached attribute" means that for read and write operations, no data is fetched from the CPU's cache. Rather, the data flows directly out through the external system memory bus to the system memory, as though no cache was present.

In other embodiments, the optimally shared memory may always be assigned a cached attribute, but when a transition occurs to a mode wherein the graphics processor will work on the data in the optimally shared memory, the data in the CPU's cache may be made coherent. A benefit of enforcing coherency prior to making the transition is that snoop cycles and their associated detriment to performance may be avoided, since the graphics processor's direct memory access (DMA) can treat the optimally shared memory as though it were already coherent. The need to perform CPU cache snooping cycles from the graphics controller is thereby avoided, and the optimally shared memory may effectively be treated as if it had always been used with the uncached attribute.

Figure 1:
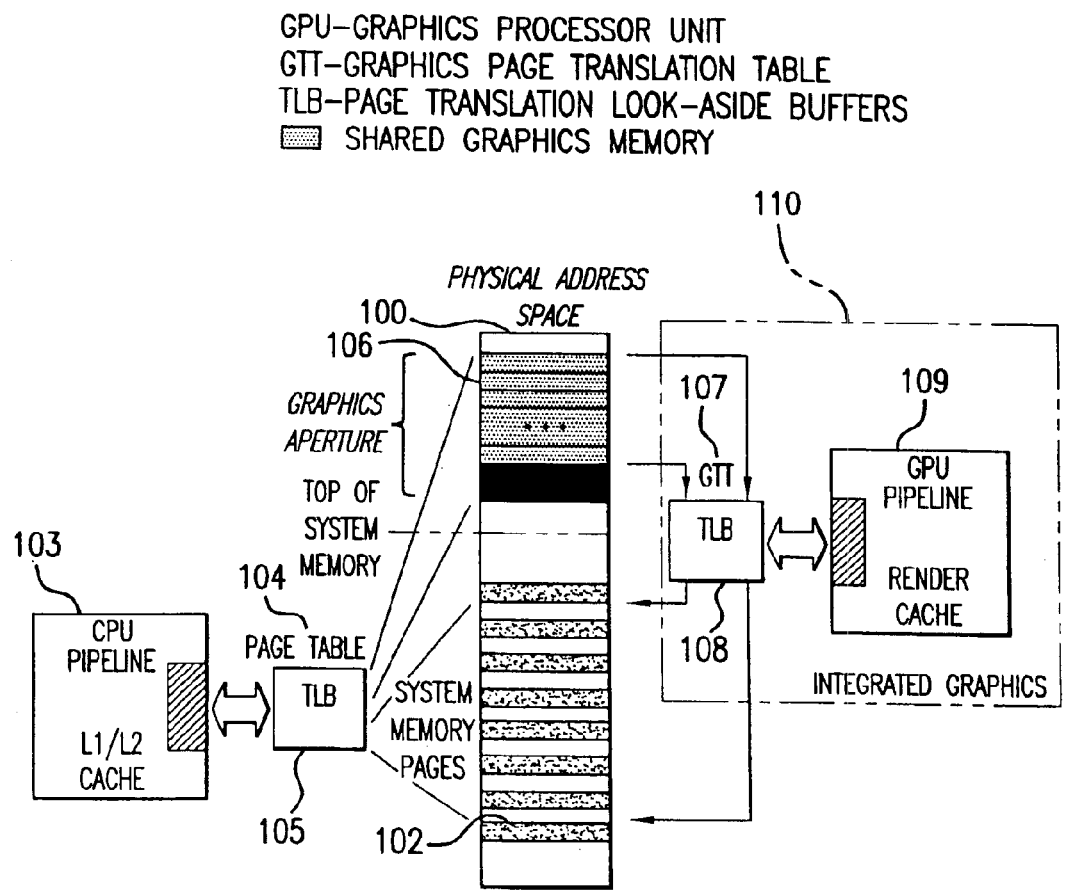
FIG. 1 shows a possible embodiment of a computer memory shared between a CPU and a graphics processor.
Figure 2:
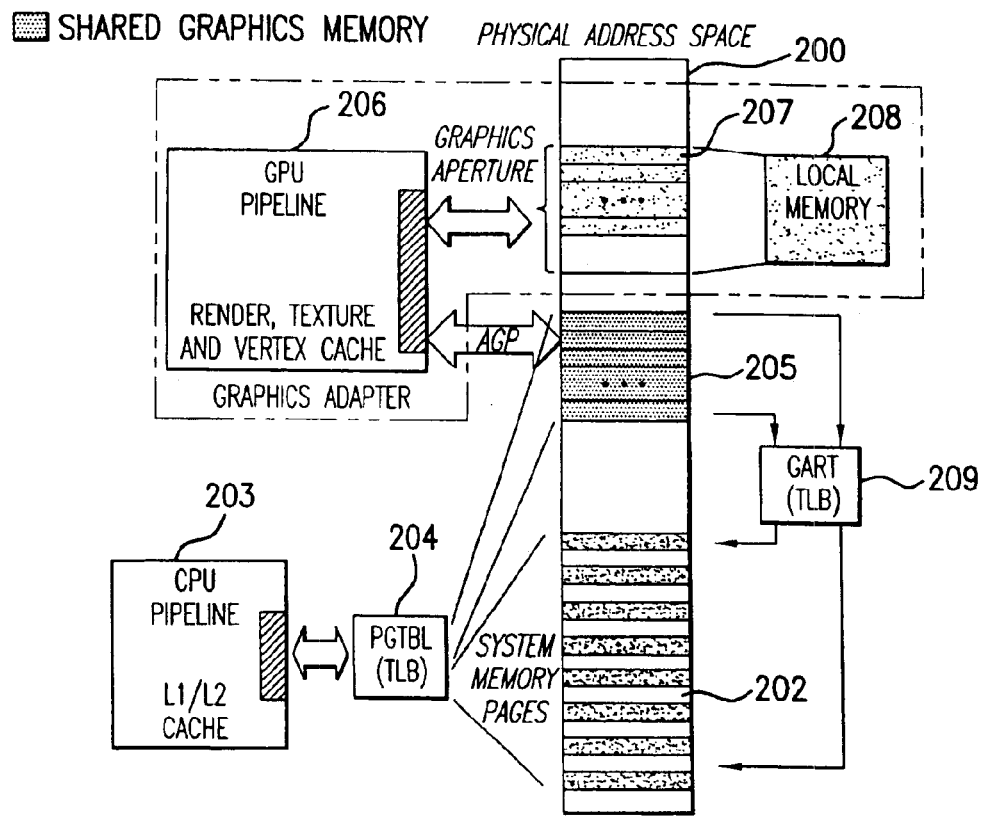
FIG. 2 shows another possible embodiment of a computer memory shared between a CPU and a graphics processor.

The following discussion of FIGS. 1 and 2 describes how a "shareable" graphics memory region may be provided according to known art. It should be understood that "shareable" as used in the following is to be distinguished from "optimally shared" according to embodiments of the invention, as described in greater detail hereinafter.

FIG. 1 shows elements of a computer system made by Intel Corporation, which is commercially available and could be suitable for implementing embodiments of the invention. Block 110 shown in FIG. 1 illustrates elements of an "integrated graphics" system wherein graphics functions are integrated into the overall system. More particularly, the graphics processor may be integrated into a memory controller hub (MCH) component of a chipset.

In the system shown in FIG. 1, shareable graphics memory may be provided as follows. A graphics processor page translation table (GTT) 107 is accessible to a graphics processor via a graphics processor unit (GPU) pipeline 109. The GTT 107, utilizing a translation look-aside buffer (TLB) 108, maps system memory pages 102 into a graphics aperture 106 in physical address space 100. Graphics aperture 106 addresses are higher than the top of system memory. The graphics aperture 106 is "visible" (i.e., capable of being utilized to access a corresponding system memory page) to the graphics processor.

The graphics aperture 106 is also visible to a host CPU via a mapping (corresponding to the GTT 107 mapping) maintained in a host CPU page table 104. The host CPU page table 104 is accessible to a host CPU via a host CPU pipeline 103. The page table 104, which may utilize a translation look-aside buffer (TLB) 105, also maintains a direct mapping of system memory pages 102; this mapping may be referred to herein as a "virtual mapping." The mapping maintained by the GTT 107 for the graphics aperture and the virtual mapping maintained by the host CPU page table 104 are different from each other, since each respectively maps addresses in non-overlapping ranges of physical address space, but each corresponds to the same system memory pages. Both mappings are visible to an application being executed by a host CPU. Accordingly, a region of shareable memory visible to both a graphics processor and a host CPU may be provided.

In alternative embodiments utilizing integrated graphics, only a mapping of a graphics aperture, visible to both a graphics processor and a host CPU, may be provided.

FIG. 2 illustrates another possible embodiment of a system for providing shareable graphics memory. In the embodiment of FIG. 2, graphics functions are not integrated with the overall system, but are instead provided by a separate "add-in" graphics card. The add-in card may be plugged into an AGP (Advanced Graphics Port[1]), or PCI (Peripheral Component Interconnect Port[2]), or other "socket," or adapter interface, of the overall computer system.

[1] See, e.g.: 1. Accelerated Graphics Port Interface Specification, Revision 1.0, Intel Corporation, Jul. 31 1996; 2. Accelerated Graphics Port Interface Specification, Revision 2.0, Intel Corporation, May 4 1998; and 3. Revision 3.0 Draft Version 0.95, Intel corporation, Jun. 12 2001.

[2] See, e.g.: PCI Special Interest Group (SIG) PCI Local Bus Specification, Revision 2.2, published Dec. 18, 1998; BCPR Services Inc. EISA Specification, Version 3.12, 1992, published 1992; USB Specification, Version 1.1, published Sep. 23, 1998; or other specifications relating to comparable peripheral buses.

In the add-in card system shown in FIG. 2, shareable graphics memory may be provided as follows. A GART (Graphics Aperture Relocation Table) 209 maps system memory pages 202 into an AGP (Advanced Graphics Port) memory area 205 of physical address space 200. The AGP memory area 205 is visible to a graphics processor via a graphics processor unit (GPU) pipeline 206 and an AGP bus.

The AGP memory area 205 is also visible to a host CPU associated with CPU pipeline 203. A host CPU page table 204, accessible to CPU pipeline 203, maintains a mapping (corresponding to the GART 209 mapping) of the AGP memory 205. Page table 204 also maintains a direct mapping (i.e., a "virtual mapping" as described above) of system memory pages 202. The mapping maintained by the GART 209 for the AGP memory area 205 and the virtual mapping maintained by the host CPU page table 204 are different from each other, since each respectively maps addresses in non-overlapping ranges of physical address space, but each corresponds to the same system memory pages. Both mappings are visible by an application being executed by a host CPU. Accordingly, a shareable memory visible to both a graphics processor and a host CPU may be provided.

An add-in card system as shown in FIG. 2 may also include local video memory 208 mapped to a graphics aperture 207.

As described in the foregoing, the CPU and the graphics processor may perform operations on data in the same region of memory. The respective accesses are typically performed serially rather than concurrently. That is, typically, an application executed by the CPU may generate data requiring operations by the graphics processor, and the CPU may write the data to the graphics memory. Then, the application may "hand off" processing to the graphics processor, requesting it to perform some rendering functions with the data. When the graphics processor is finished performing the requested operations, it may in turn hand off processing back to the application.

In consideration of the above-described handing-off process, embodiments of the invention enable the shareable memory to be used in an optimal manner. Thus, hereinafter where the shareable memory is being created or modified according to embodiments of the invention, it is referred to as "optimally shared memory".

Figure 3:
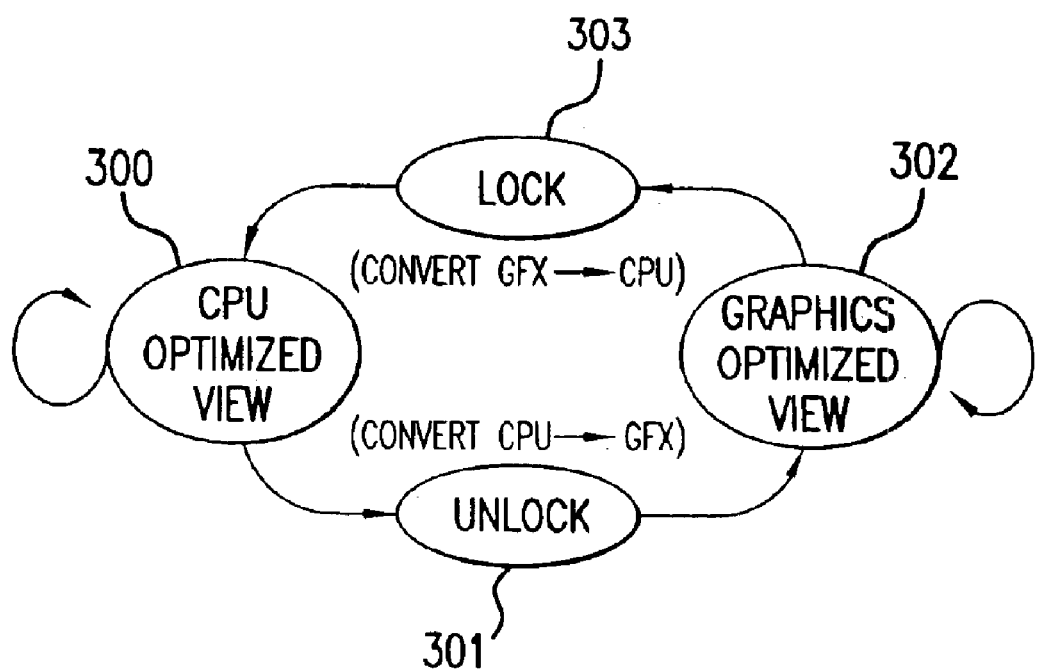
FIG. 3 shows a state diagram illustrating transitions between a mode wherein the CPU is using the optimally shared memory, and a mode wherein the graphics processor is using the optimally shared memory.

FIG. 3 is a state diagram illustrating handing off between the CPU and the graphics processor according to embodiments of the invention. FIG. 3 shows transitions between a mode wherein a host CPU is using the optimally shared memory, and a mode wherein a graphics processor is using the optimally shared memory. For convenience, when the CPU is using the optimally shared memory, the optimally shared memory may be referred to as being in a "CPU view", "CPU optimized view" or "CPU optimal view", while when the graphics processor is using the optimally shared memory, the optimally shared memory may be referred to as being in a "graphics view", "graphics optimized view" or "graphics optimal view".

Ellipse 302 represents a period of time wherein the optimally shared memory is in a graphics processor view. The view may be "optimized" in that a caching attribute of the optimally shared memory has been assigned such that it is favorable to the graphics processor's performance.

There may be a transitional phase between the graphics-optimized view of the optimally shared memory and the CPU-optimized view. According to embodiments of the invention, the attribute of the optimally shared memory favorable to the CPU's performance may be assigned during the transitional phase between the graphics-optimized view and the CPU-optimized view.

The transitional phase may include a "Lock" operation as indicated in ellipse 303. The Lock refers to a known API (Application Program Interface) which may be utilized according to embodiments of the invention. The Lock API may be called by an application being executed by the CPU. A Lock API, in general, reserves a memory region for the exclusive use of an application issuing the Lock.

Ellipse 300 represents a period of time wherein the optimally shared memory is in a CPU view. According to embodiments of the invention, the view may be "optimized" in that a caching attribute of the optimally shared memory has been assigned such that it is favorable to the CPU's performance (e.g., the optimally shared memory may be cached). In particular, for example, the optimally shared memory may be assigned a Write-Back attribute.

There may be a transitional phase between the CPU-optimized view of the optimally shared memory and the graphics-optimized view. According to embodiments of the invention, the attribute of the optimally shared memory favorable to the graphics processor's performance may be assigned during the transitional phase between the CPU-optimized view and the graphics-optimized view.

The transitional phase may include an "Unlock" operation as indicated in ellipse 301. The Unlock refers to a known API which may be utilized according to embodiments of the invention. The Unlock API may be called by an application being executed by the CPU. Unlock APIs, in general, undo or reverse a Lock API executed earlier. The application may call the Unlock API to notify the graphics processor that, for the time being, the CPU is no longer using the optimally shared memory and that the optimally shared memory is now accessible to the graphics processor.

According to embodiments of the invention, during the transitional phase from the CPU-optimized view to the graphics-optimized view, cache coherency may be "enforced" on the optimally shared memory (i.e., it may be ensured that required data in the CPU's cache is evicted back to memory) as described later in greater detail.

A graphics "surface" may be one kind of data that resides in optimally shared memory that undergoes a transition between a CPU-optimized view and a graphics-optimized view as described above. In general, however, graphics surfaces need not reside in shared memory.

Graphics surfaces are used for a number of purposes. Surfaces may be buffers for data such as commands, pixels or vertices transferred from an application to the graphics processor. Surfaces may contain results of a rendering which will be displayed on an output display device, or simply returned to the application. Surfaces may be created for temporary storage of intermediate results of the graphics processor and as such never need to be visible to applications. Surfaces may be created for intermediate storage and use of applications, and as such never need to be visible to the graphics processor.

Figure 4A:
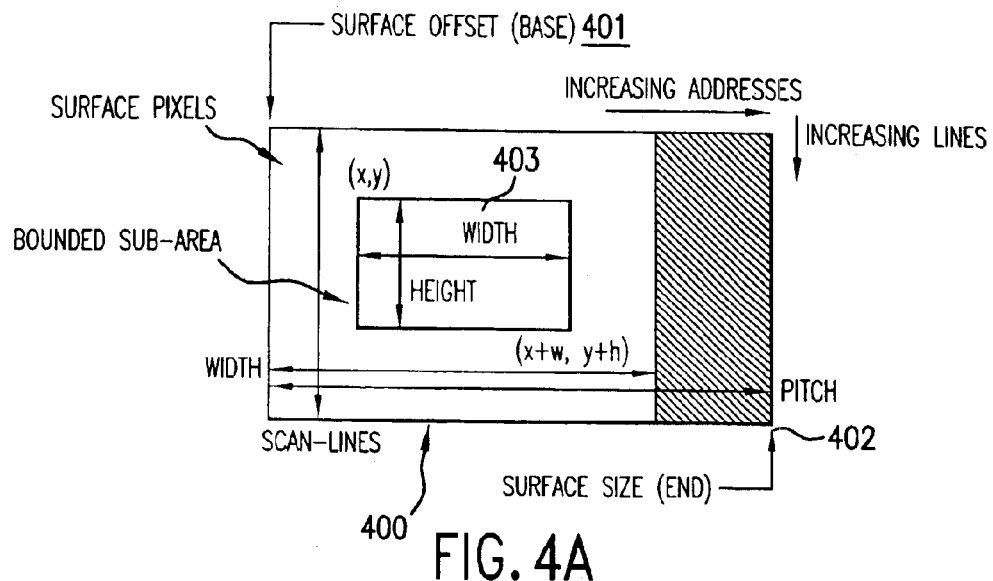
FIGS. 4A and 4B show examples of graphics surfaces and buffers, as well as types of sub-areas of the surfaces that can be described through surface parameters.

FIG. 4A illustrates an example of a graphics surface 400 commonly referred to as a "rectangular surface". A rectangular surface typically contains graphics pixels which are organized horizontally into scan lines with a pre-defined pitch and width made up of pixels. Multiple scan lines may be concatenated vertically to form a surface. Such a graphics surface may typically be so organized in order to permit conveyance to an output display device which also has a given horizontal width and vertical scan line count, or to permit rendering of the surface as a texture patch onto another surface which will in turn be displayed or used in subsequent operations.

The graphics surface's area may be defined by its offset from a base memory address 401 and its size, which is usually defined in terms of the offset of an end point 402 from the base memory location 401 of the surface. Bounded sub-areas may be defined within a surface, such as bounded sub-area 403. A bounded sub-area may be said to be "active" when a graphics application or graphics processor is operating on it. Memory locations in a bounded sub-area may be defined in terms of the sub-area's base coordinates x, y and offsets w, h from the base coordinates, or alternatively expressed as the co-ordinates of the top, left, right and bottom boundaries of the bounded sub-area. The foregoing coordinate system can also be used to describe the entire surface by the top, left, bottom and right rectangular co-ordinates relative to the surface origin. Hereafter the expression of a rectangular surface or sub-area will be referred to by parameter shorthand RECT(t,l,b,r), wherein t,l,b,r respectively denote the top, left, bottom and right rectangular co-ordinates relative to the surface origin.

Figure 4B:
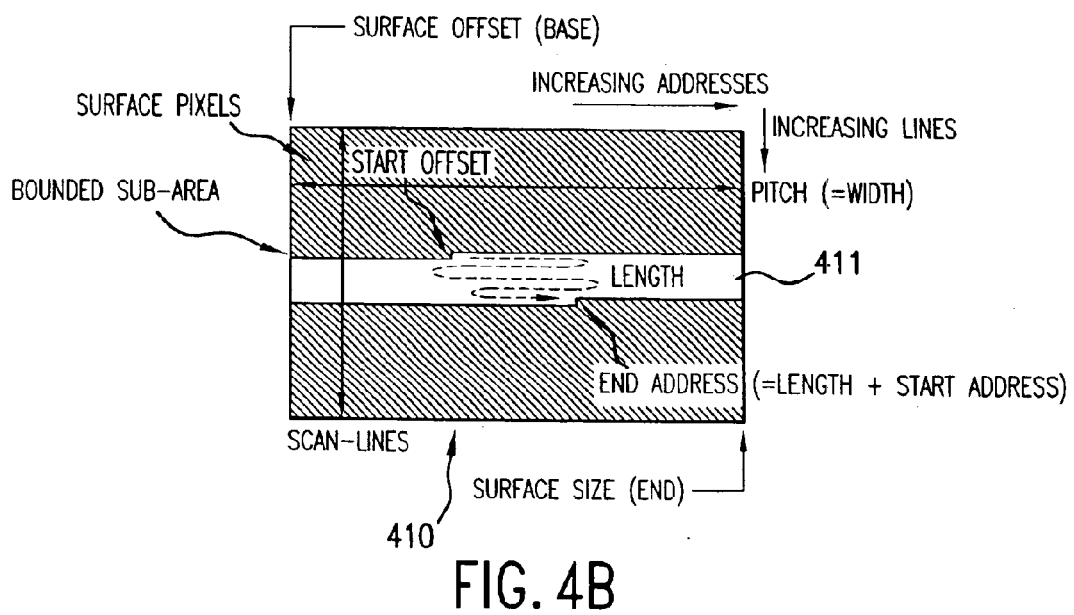

FIG. 4B shows another possible configuration of a graphics surface 410 commonly referred to as a "linear surface". In graphics surface 410, a bounded sub-area 411 extends across the pitch of the surface. For the bounded sub-area 411, a Start Offset address and a Length may be specified. Address locations of pixels in the surface increment linearly from the Start Offset address to an End address. Hereafter the expression of a sub-area will be referred to by parameter shorthand LIN(o,l), wherein o and l respectively denote the Start-Offset relative to the surface origin, and length of the sub-area relative to the Start-Offset. Such surfaces are typically used for buffers which convey grouped graphical data such as lists of rendering commands, lists of vertices or vertex indices, or of compressed pixel data using video or texture compression techniques.

The Lock and Unlock APIs, discussed above in connection with FIG. 3, may permit certain parameters to be specified. These parameters may include, for example, a specification of only a bounded sub-area within a surface to be locked or unlocked, or a specification of an entire surface to be locked or unlocked. Usually, a Lock API and subsequent Unlock API specify the same bounded sub-area or entire surface to be locked and subsequently unlocked.

Figure 5:
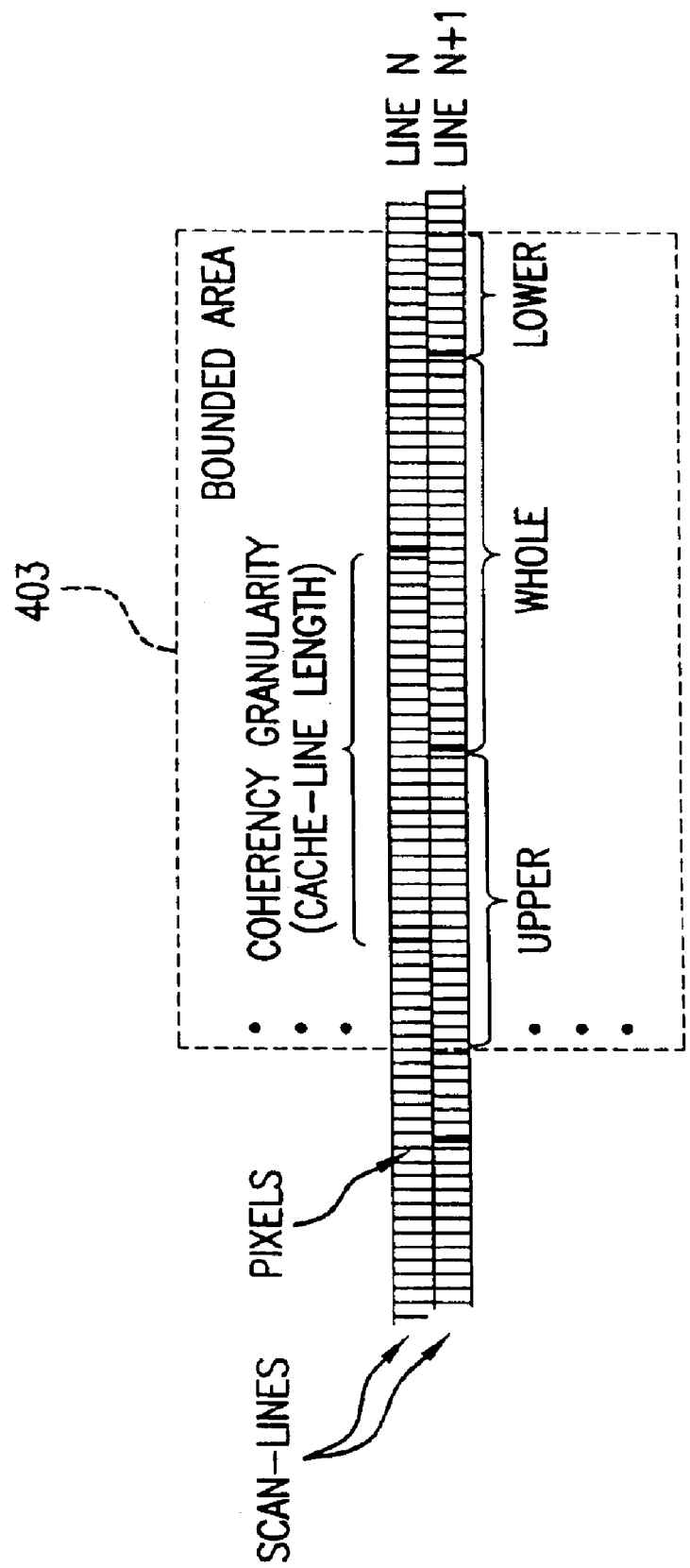
FIG. 5 shows scan lines in a bounded area of a graphics surface.

When a graphics surface is created and an application is manipulating pixels within the surface, portions of the surface may reside in the host CPU's cache for periods of time. Within the cache, a portion of the surface data that is handled as a unit is referred to as the "granularity" of the data. FIG. 5 shows an example of a bounded area such as bounded sub-area 403 while it is residing in a cache. Scan lines N and N+1 comprise pixels and overlie bounded sub-area 403.

Further, the extent of scan line N+1 within the bounded sub-area illustrates how a scan line may be regarded as being constituted by an "upper" segment, a "whole" segment and a "lower" segment. Each of the "upper" and "lower" segments has an extent which is less than a cache line's length, while the "whole" segment has an extent equal to a cache line's length.

Cache control "primitives" exist which allow low-level control of lines of data within the cache based on a particular granularity, ranging from one cache line up to all lines. Such primitives may be used to enforce cache coherency over a range of data within the cache, or over the entire cache itself. For example, a known Intel® Pentium 4 processor cache control instruction primitive called "CLFLUSH" (cache-line flush) flushes cache data with a granularity equal to the cache-line's length for all cache lines associated with a supplied logical memory address parameter.

Advantageously, according to embodiments of the invention, a bounded sub-area of a surface may be made coherent in segments of a cache line's length or less, by using a primitive such as CLFLUSH. Such an approach may be particularly beneficial if the time it takes to make a bounded sub-area coherent in segments of a cache line's length or less is less than the time it would take to make the bounded sub-area coherent using a primitive with a coarser granularity, or by flushing the entire L1/L2 cache.

On the other hand, it is possible that the amount of time required to make the bounded sub-area coherent in segments as described above may exceed the amount of time required to simply flush the entire L1/L2 caches. The maximum time required to make a given bounded sub-area coherent in segments can be calculated, based on the external memory bus speed and width and the size of the cache area to be made coherent in units of the external bus width. The maximum time required to flush the entire cache can be similarly calculated based on the size of the cache and the external memory bus speed and width, as well as other processor overheads. According to embodiments of the invention as described in greater detail below, the maximum time required to make a given bounded sub-area coherent in segments may be compared to a maximum time required to flush the entire cache, and the approach which takes the least time may be used to make the bounded sub-area coherent.

Another primitive, "Cache Page Flush" (CPFLUSH) is known which flushes cache data with a granularity of a page. Under given circumstances, a Cache Page Flush may be faster and more efficient than a cache-line flush. Similarly, cache flushes of greater granularity can readily be contemplated. For example, a "Physical Address Region Cache-Flush" primitive could efficiently enforce coherency for all lines of graphics pixel data associated with a physical page (e.g., 4 KB) of memory or more.

Optimally shared memory according to embodiments of the invention may be created and utilized under different circumstances. An application may explicitly specify that it wants to create and use optimally shared memory. On the other hand, optimally shared memory may be provided transparently to an application, i.e., without the application being aware that it is using optimally shared memory.

In the former case, a graphics driver may first enumerate, or "advertise" for an application, a list of types of surfaces that are supported by the graphics subsystem, and the application may select the "optimally shared" type from the list and request allocation of a memory region of the optimally shared type. To allocate an optimally shared memory region, an application may request, through an API to the graphics driver, a memory region having the previously enumerated optimally shared type. For example, the application may request the creation of a graphics surface having an optimally shared memory type.

In the latter case, an application may not be presented with an enumerated list as described above, and instead optimally shared memory may be provided by the graphics driver for the application transparently, or "behind the scenes". The graphics driver may decide to use optimally shared memory according to a "usage policy" based on information that it receives from an application. For example, instead of explicitly selecting the optimally shared memory type from an enumerated list, the application may have indicated how it intends to use a graphics surface through "hints" that are passed from the application in a graphical API to the graphics driver. Examples of hints include information specifying, for example, that the application will be reading/writing from the surface, or that the surface will be purely opaque (write-only; i.e., for example, only used as a target of graphics processor rendering and never read back by the application). Based on hints, the graphics driver may, transparently to the application, allocate an optimally shared memory surface and assign its caching attributes based on an evaluation of how performance may best be enhanced.

In yet another embodiment, the graphics driver may, upon gauging usage and demands, decide that graphics memory previously created in one memory type or location may be better suited to be changed to an optimally shared type. Then, at a later time, that graphics memory type may be changed back to the original type and/or location, based on a reversal in the application's access usage patterns.

As noted earlier, in embodiments of the invention, the optimally shared memory may have a caching attribute assigned depending on whether the optimally shared memory is to be used by the CPU or by the graphics processor. When a transition occurs between the CPU view and the graphics processor view or vice versa, the assigned attribute may be changed. When the transition is from the CPU view to the graphics processor view, the data in the CPU's cache may be made coherent before the optimally shared memory is handed off to the graphics processor. Such embodiments may be advantageously utilized, for example, when an application does not explicitly specify that it wants optimally shared memory, and instead, the graphics driver dynamically determines (e.g., through hints as described above) that optimally shared memory should be used. In such a case, the graphics memory may already be "old"; i.e., have been used as another type.

On the other hand, according to other embodiments, the optimally shared memory may always have a cached attribute (i.e., no change occurs in the assigned attribute). Such embodiments may be advantageously utilized, for example, when an application decides from the outset that it wants to create and use optimally shared memory. In such embodiments, when a transition occurs from the CPU view to the graphics processor view, the data in the CPU's cache may be made coherent before the optimally shared memory is handed off to the graphics processor. In order not to trigger snoop cycles, the graphics processor's memory interface engine may be instructed through programmable DMA register settings, through the page attributes of the graphics processor page tables entries, or by other means, to treat the optimally shared memory as though it were uncached when the optimally shared memory is in the graphics processor view. Most processors typically support treating graphics memory as uncached, independently of the CPU's page table cache attribute settings, since most solutions to the coherency problem revolve around using graphics memory as uncached. In the CPU's page table entries for the memory, however, the memory continues to have a cached attribute.

The embodiment wherein the assigned attribute is changed during a transition between the CPU view and the graphics processor view is discussed first in greater detail in the following.

Figure 6:
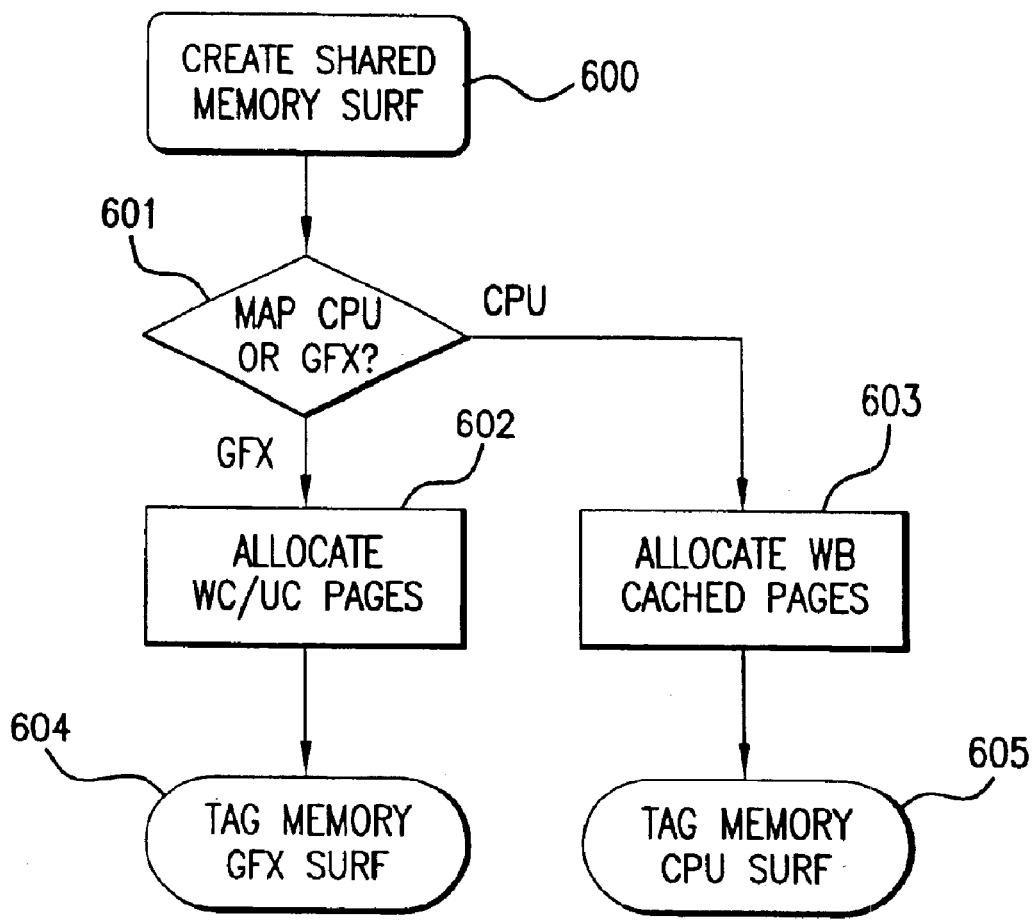
FIG. 6 shows a flow diagram of a process for allocating an optimally shared memory region according to one embodiment.

FIG. 6 shows a process flow for setting the caching attributes of an optimally shared memory surface depending upon which view the surface will be in.

An optimally shared surface may initially be created as shown in block 600. When a surface is created, various data structures may be associated with the surface to facilitate operations thereon. For example, according to one embodiment, a unique identifier or "Surface handle" may be associated with the surface and act as a pointer to the surface. This Surface handle may further point to a "Surface-Object handle" which in turn points to a "Surface-Object". The Surface-Object may include private data structures including such information as memory type descriptors (e.g., whether the memory is optimally shared), the surface's memory base offset, pixel depth, size (width, height), and other characteristics of the surface. The private data structures may also include "members" which contain information about the Surface-Object.

After an optimally shared memory surface is created as shown in block 600, attributes of the memory may be set depending on which view the surface will be in, as determined in block 601.

If the surface will be in the view of the graphics processor, the attribute of the surface may be set to be the Write-Combine (or uncached) attribute, as shown in block 602. Then, within the Surface-Object, a type descriptor "tag" may be set indicating that this memory is currently mapped optimally for graphics processor usage as shown in block 604.

On the other hand, if the surface will be in the view of the CPU, the attribute of the surface will typically be set to be the Write-Back (cached) attribute, as shown in block 603, and the Surface-Object type descriptor may be tagged as shown in block 605 indicating the surface is currently mapped optimally for CPU usage.

Once the surface is created, the application may request to lock or unlock the surface, by calling a Lock API or Unlock API. The Lock and Unlock APIs will typically include parameters such as the Surface-Object's handle or a "Bounded Area" parameter. The Bounded Area parameter describes a sub-area of the surface as outlined above. Locking the surface allows the application to write data into the surface.

Assuming the optimally shared memory was initially used by the CPU, and that the optimally shared memory was initially used in cached mode, when the application has reached a point in processing wherein, at least for the time being, it will perform no further accesses to the optimally shared memory, it may then hand off processing to the graphics processor. To do so, the application may call an Unlock API, which notifies the graphics processor that the optimally shared memory region is now accessible. In the Unlock operation, the graphics driver implicitly knows that the application has finished modifying the surface and that the surface is no longer going to be accessed by the CPU. Therefore, the optimally shared memory allocated to the surface which had a cache attribute favorable to the CPU view may have the cache attribute changed to one favorable for the graphics processor view.

Because the caching attribute of the shared memory is to be changed from a CPU-optimized mode (i.e., cached) to graphics processor-optimized mode (i.e., uncached), the optimally shared memory should be made coherent.

Figure 7A:
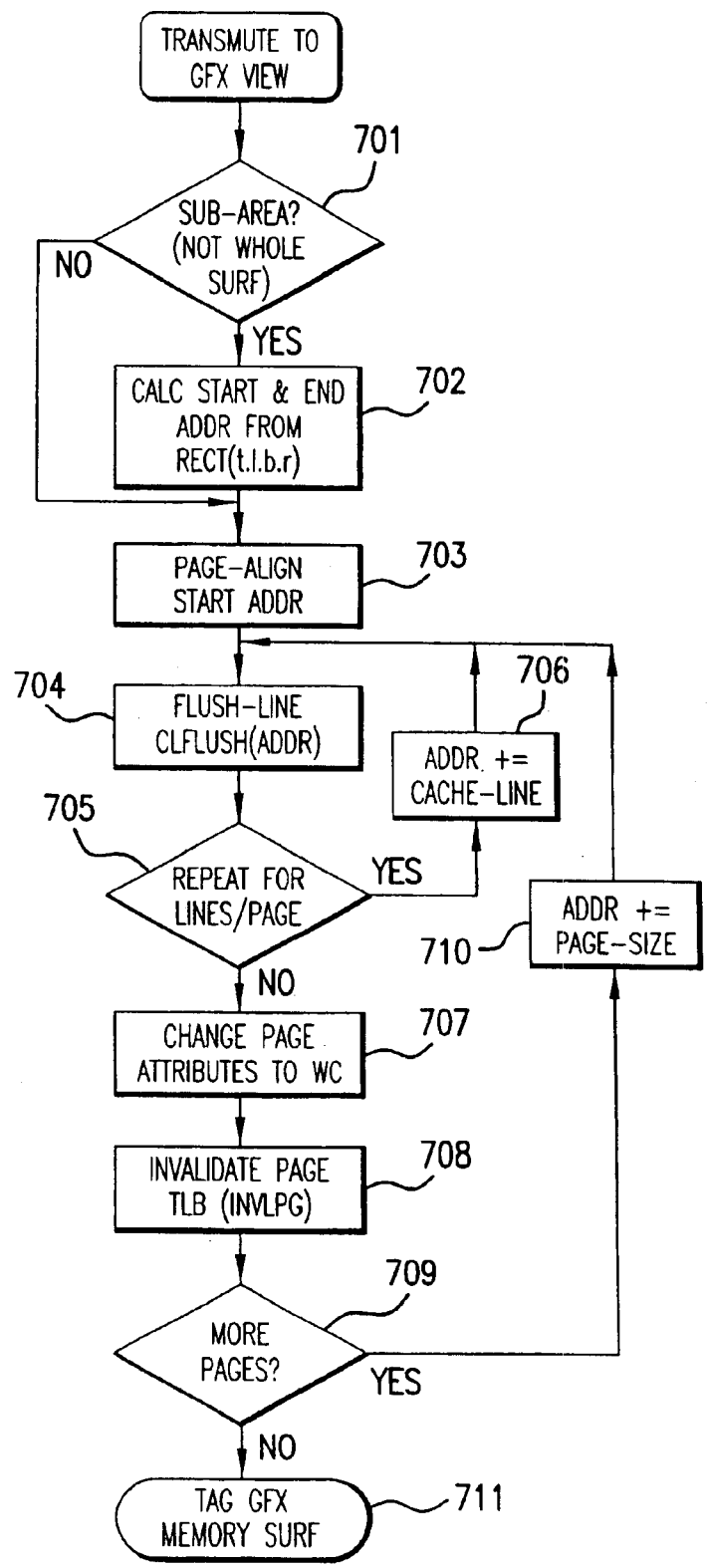
FIG. 7A shows a flow diagram of a process for making a surface or bounded sub-area of the surface coherent according to the embodiment of FIG. 6.

FIG. 7A shows a process flow for converting the optimally shared memory from a CPU view to a graphics processor view when the process includes changing the caching attribute of the memory in a manner that enforces coherency. As shown in block 701, it may first be determined whether a region of the shared memory worked on by the CPU is an entire surface, or only a sub-area of a surface. This sub-area or entire surface area may correspond to the Bounded Area or Surface-Object parameters which were passed to the Lock and Unlock APIs as discussed above.

If the optimally shared memory region is a sub-area, a start and end address of the sub-area may be calculated as shown in block 702. As outlined in connection with FIG. 4A, the sub-area may be described by the RECT(t,l,b,r) parameter describing the location and dimensions of the sub-area. Alternatively as outlined in FIG. 4B, the sub-area may also be described by a Start Offset from the surface base address and Length parameter. Then, the flow may progress to block 703.

On the other hand, if it is determined that the region of optimally shared memory is not a sub-area (i.e., it is an entire surface), the flow may progress directly to block 703. In block 703 a starting page may be derived from the starting address of the memory by adjusting the address down to a page-aligned start. This is typically done by throwing away the least significant bits of the address up to the size of the page. For example, if a page was 4KB then by bitwise AND'ing the address with the 1's complement inverse of (4KB−1) the page granular start address "addr" could be derived.

Next, as shown in block 704, a cache line having the address "addr" may be flushed, for example by passing the "addr" parameter to a cache-line flush primitive such as "CLFLUSH."

The process of flushing cache lines may continue until all cache lines have been flushed, as shown in blocks 705 and 706. In block 705, it may be determined whether any cache lines remain to be flushed. If the result of the determination of block 705 is affirmative, the next line of the sub-area may be flushed by incrementing the "addr" parameter as shown in block 706, and returning to block 704.

Once all cache lines have been flushed, the flow may progress to block 707, wherein the caching attribute of the optimally shared memory is changed from cached (e.g., Write-Back) to uncached (e.g., Write-Combine). Then, as shown in block 708, the process may invalidate the page TLB (Translation Lookaside Buffer) entry containing the former caching attribute, using a known Intel® processor cache control instruction such as INVLPG. This operation may be performed to allow the change of the memory attributes to take effect and be propagated in other CPUs which may be in the system, using the inter-processor communication bus.

The process may continue for each page in the optimally shared memory, as shown in blocks 709 and 710. In block 709, it may be determined whether any pages remain to be flushed. If the result of the determination of block 709 is affirmative, the next page may be flushed by incrementing the "addr" parameter as shown in block 710, and returning to block 704.

If no more pages remain to be flushed, the flow may progress to block 711, wherein the memory type descriptor in the Surface-Object is tagged indicating the optimally shared memory is now in graphics processor view, in order to allow tracking the current view of the surface in subsequent operations on the surface.

After working on the data in the optimally shared memory for a period of time, the graphics processor may hand off the optimally shared memory back to the CPU. During the hand-off, the caching attribute of the optimally shared memory may be changed from one favorable for the graphics processor to one favorable for the CPU. According to embodiments of the invention, during a transitional phase of the hand-off back to the CPU, a surface or sub-area which had been previously worked on by the graphics processor while the optimally shared memory was in the graphics-optimized view may be synchronized with respect to any pending rendering commands that are active or queued to be rasterized on the surface, by waiting until those commands have completed. Additionally, the graphics driver may track pending rasterization and flush the render cache causing all relevant pixels remaining in the graphics processor to migrate to the surface.

Figure 7B:
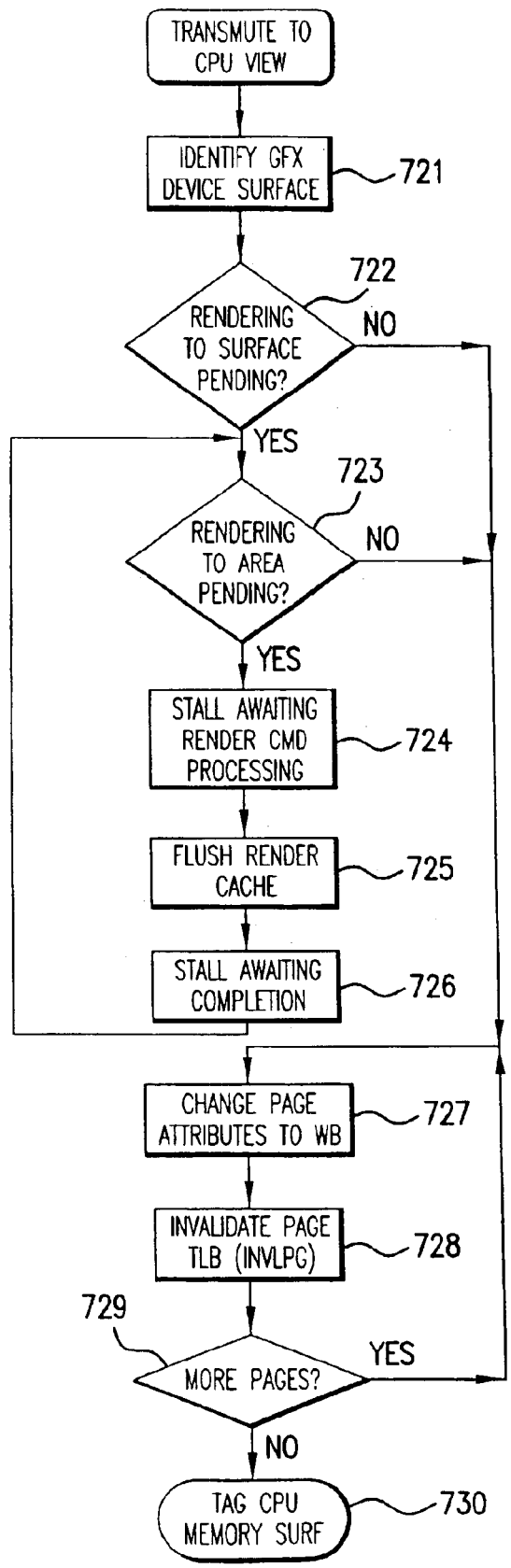
FIG. 7B shows a flow diagram for completing pending rendering operations on a graphics surface and changing the caching attribute of the surface according to the embodiment of FIG. 6.

FIG. 7B is a flow diagram illustrating one possible embodiment of a method implemented during the transitional phase from a graphics processor view to a CPU view, to synchronize the optimally shared memory with respect to any pending rendering commands as described above.

As shown in block 721, a surface that had previously been used by the graphics processor may be identified as having pending operations associated with it. These pending operations may be indicated by descriptors and members within the Surface-Object that were previously set when graphics operations on the surface were initiated. Then, as shown in block 722, it may be determined whether the output of any rendering to the surface is still pending, in which case the surface must be made coherent with respect to the graphics processor before it can be handed back to the CPU. If the result of the determination of block 722 were negative, no further processing would be needed. The flow could progress to block 727.

On the other hand, if rendering to the surface were pending, indicating that there are surface pixels that are as yet not completely rendered and data as yet not written out to memory, the flow may progress to block 723. In block 723, it may be determined whether rendering to any sub-area within the surface is pending, using private data accumulated by the graphics driver and in members or descriptors of the Surface-Object. If no rendering is pending, the flow may progress to block 727.

If the result of the determination of block 723 is affirmative, on the other hand, the flow may progress to block 724. In block 724 any rendering commands that apply to the surface being handed off which are still pending in the graphics processor will be processed. This includes both commands which will render to the optimally shared surface, as well as those which will render to unrelated surfaces, but where pixels in the optimally shared surface are used to produce a result going to an unrelated surface.

The flow may then progress to block 725, wherein the result of the execution of the previously identified render commands, i.e., rendered pixels, is flushed from any internal rendering queues in order to ensure the surface is coherent with respect to the graphics processor. The flow may continue to block 726 wherein a continued iteration of blocks 723–726 may be stalled until it is assured that the rendered commands and rendering output has fully completed. Blocks 723–726 may be successively repeated until there is no relevant rendering output remaining. At that time, flow may progress to block 727.

If the result of the determination of block 722 is negative, the flow may progress to block 727, wherein the caching attribute of the shared memory is changed from uncached (e.g., Write-Combine) to cached (e.g., Write-Back). Then, as shown in block 728, the process may invalidate the page TLB containing the former caching attributes, using a known Intel® processor cache control instruction such as INVLPG. This operation may be performed to allow the change of the page attributes to take effect and be propagated other CPUs, which may be in the system, through the inter-processor communication bus.

The process may continue for each page in the shared memory. In block 729, it may be determined whether any pages remain to have their caching attributes changed. If the result of the determination of block 729 is affirmative, the process may repeat blocks 727 and 728.

If no more pages remain to have their caching attributes changed, the flow may progress to block 730, wherein Surface-Object descriptors are tagged to indicate the optimally shared memory is now in the view of the CPU and application software.

The embodiment will now be described wherein the optimally shared memory may always be assigned a CPU-optimal cached attribute, but wherein when a transition occurs from the CPU view to the graphics processor view, the data in the CPU's cache may be made coherent in order to allow the graphics processor to treat the optimally shared memory as uncached. When transitioning from the graphics processor view to the host CPU view, the graphics data may be made coherent with respect to the graphics processor's cache.

Figure 8:
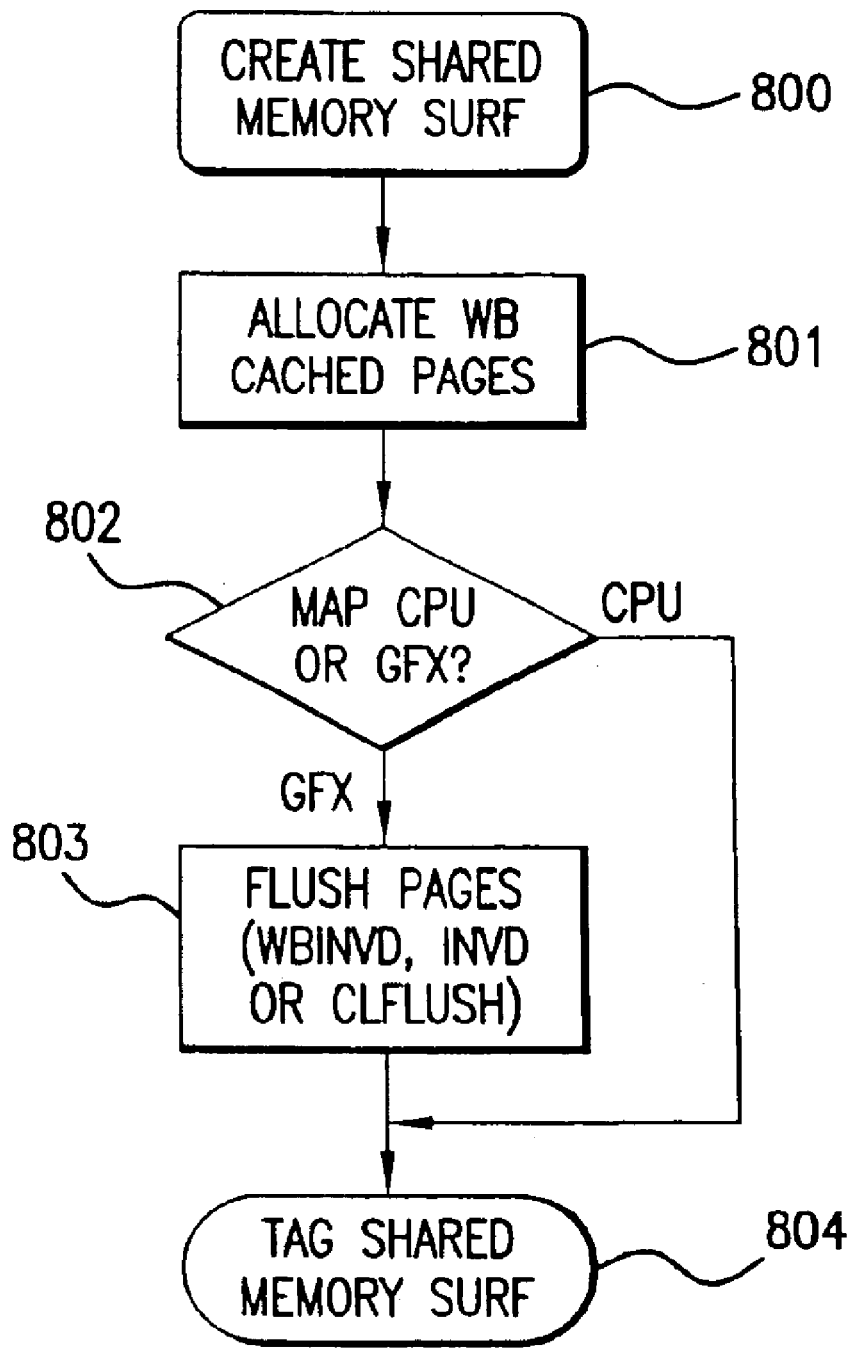
FIG. 8 shows a flow diagram of a process for allocating an optimally shared memory region according to another embodiment.

FIG. 8 illustrates a process flow, according to one possible embodiment, for creating or allocating an optimally shared memory surface according to the latter embodiment. In the process shown in FIG. 8, the optimally shared surface is created such that it always has a cached (e.g., Write-Back) attribute. That is, the caching attribute of the optimally shared memory does not depend on whether the CPU is using the memory or the graphics processor is using the memory. Rather, the graphics processor is instructed to treat the optimally shared memory as though it were uncached when the memory is in the graphics processor view. Typically, the graphics processor has interface control registers or page table descriptors (as in FIG. 1, 107) that indicate to the graphics processor's memory interface and transfer logic whether or not the memory is cached by the processor and accesses require a snoop operation. By applying the method according to embodiments of the invention the optimally shared surface is, however, made coherent during a transition phase between a CPU view and a graphics processor view, removing the need for snooping.

As shown in blocks 800–801, the optimally shared memory surface may be allocated in pages assigned a Write-Back (WB) caching attribute. As shown in block 802, it may then be determined from type descriptors or hints how the newly-allocated memory will be used: e.g., read/write by the CPU, or simply opaque (only for use by the graphics processor).

If the CPU will initially be using the surface, the flow may proceed directly to block 804, wherein the newly-allocated surface is tagged in the memory type descriptor of the Surface-Object to indicate its current view. If, on the other hand, the graphics processor will initially be using the surface, the surface may be made coherent to clear out any data associated with the surface that may still be in the cache from previous and/or unrelated application use of the memory. This operation is shown in block 803 and comprises flushing any pages in the cache by a known coherency-enforcement primitive such as the Intel® Processor cache control instructions WBINVD (Write-Back Invalidate Cache), INVD (Invalidate Cache) or CLFLUSH. A CPFLUSH (Cache Page Flush) or other processor cache control primitives could also be utilized for this purpose. Then, the newly-allocated surface may be identified or tagged through the memory type descriptor inside the Surface-Object as shown in block 804 to indicate its current view.

If the surface is initially allocated in a CPU view, the application may request to lock the surface, using the handle for the surface passed to the application by the graphics driver. Locking the surface allows the application to write data into the surface. The application may request the lock by calling a Lock API as described above.

Figure 9A:
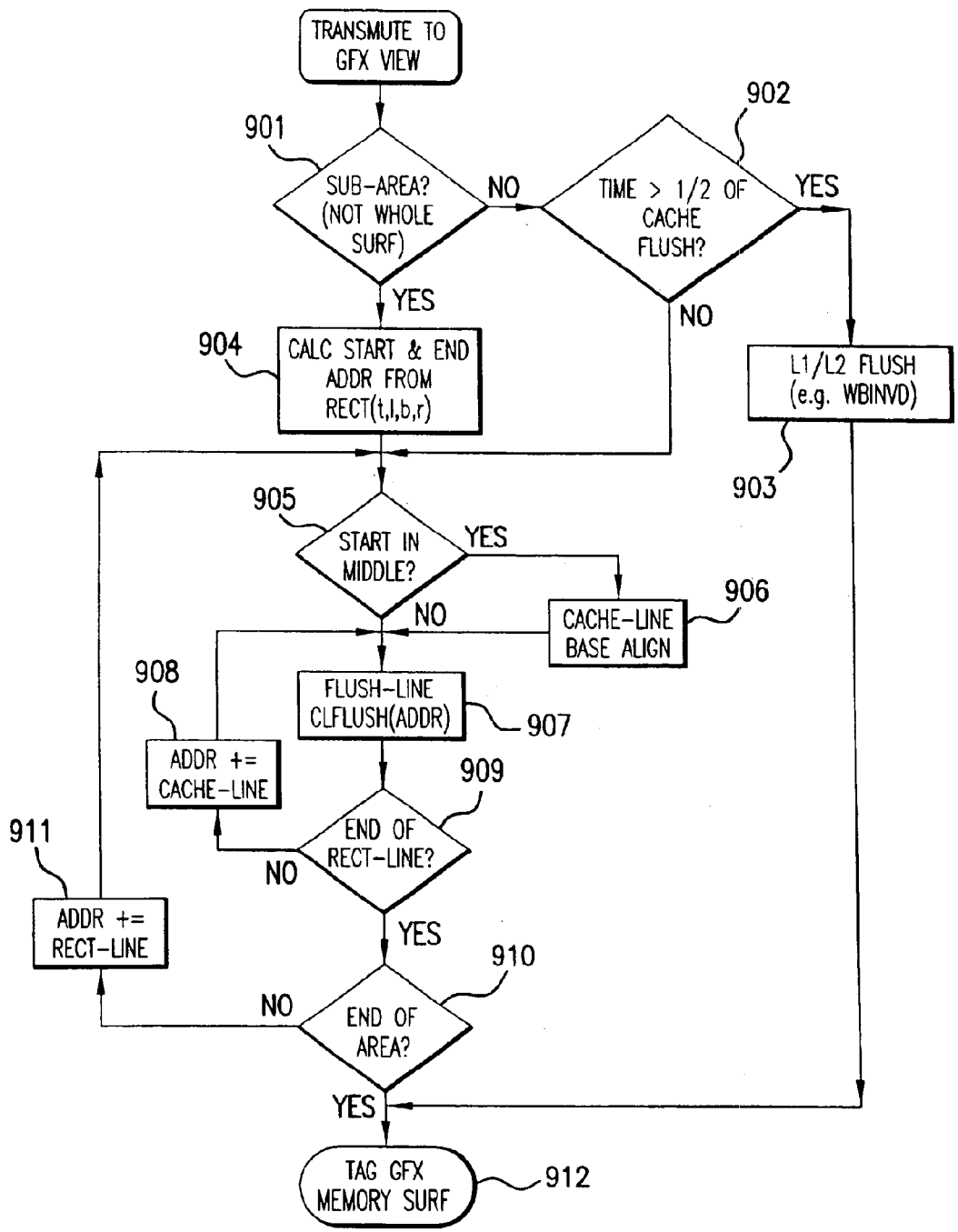
FIG. 9A shows a flow diagram of a process for making a surface or bounded sub-area of the surface coherent according to the embodiment of FIG. 8.

When the view of the surface changes to a graphics processor view, because the CPU may have been reading and writing on the optimally shared memory when using it, the optimally shared memory needs to be made coherent with respect to the graphics processor. FIG. 9A is a flow diagram illustrating one possible embodiment of a method for enforcing coherency.

As shown in block 901, it may first be determined whether a region of the optimally shared memory in use by application software running on the CPU is covering an entire surface, or simply a bounded sub-area within a surface. This bounded sub-area or entire surface area may correspond to the bounded sub-area or entire surface area which were subject to the Lock and Unlock as discussed above.

If it is determined that the region of optimally shared memory is not a sub-area (i.e., it is an entire surface), a calculation may be performed as shown in block 902, to determine if the time it would take to make the surface coherent is greater than ½ of the time it would take to perform a flush of all caches of all CPUs (since embodiments of the invention may be used in multi-CPU systems).

If the result of the calculation of block 902 is affirmative, a flush of the entire CPU(s) L1 and L2 caches may be performed as shown in block 903, to store the contents of these caches in the optimally shared memory, making it coherent. Then, the memory type descriptor of the Surface-Object may be tagged as shown in block 912 indicating the surface is in the view optimal for graphics processor usage. If the result of the calculation of block 902 is negative, the flow may progress to block 905, described below.

If the optimally shared memory region is a sub-area, a start and end address of the sub-area may be calculated as shown in block 904. The sub-area may be described as in FIG. 4A, by a RECT(t,l,b,r) parameter, where the bounded shape of the sub-area is described using the top, left, bottom, right coordinates of the rectangle indicating the location and dimensions of the sub-area. Alternatively the sub-area may be a linear surface as described as in FIG. 4B by a Start Offset address and a Length.

Once the start and end addresses of the sub-area are calculated, the flow may progress to block 905 which will detect if the sub-area starts mid-way into a cache-line. If the result of the determination of block 905 is affirmative, block 906 may be performed which will re-align the start of the area onto which coherency will be enforced so that the cache line flush will direct the dirty cache line invalidate at the specific addresses intended to be made coherent, and the flow may progress to block 907.

If the result of the determination of block 905 is negative, the flow may progress directly to block 907. In block 907, a cache line having cache data corresponding to the address "addr" may be flushed, for example by passing the "addr" parameter to a cache-line flush primitive such as "CLFLUSH."

Then, as shown in block 909, it may be determined whether the end of a line of the rectangular or linear sub-area has been reached. If the result of the determination of block 909 is negative, the next cache line may be flushed by incrementing the "addr" parameter as shown in block 908, with an amount equal to the size of a cache-line and returning to block 907.

If the result of the determination of block 909 is affirmative, the flow may progress to block 910. In block 910, it may be determined whether the end of the sub-area has been reached. If the end of the sub-area has been reached, the entire sub-area has been flushed to make the optimally shared memory region coherent for use by the graphics processor, and the flow may progress to block 912.

Otherwise, the next line of a rectangular sub-area may be flushed by incrementing the "addr" parameter as shown in block 911, with an amount equal to the size of the surface pitch minus the width of the sub-area adjusted for any alignment, and returning to block 905.

A cache-line flush (CLFLUSH) as used in the above-described process has a relatively small granularity (i.e., it handles relatively small portions of data). By contrast, a page flush (CPFLUSH) may flush all of the cache lines associated with a page of memory. Thus, according to embodiments, a process which enforces coherency when the optimally shared memory is to be handed off to the graphics processor as described in the following may use page flushes rather than cache-line flushes, in order to enforce coherency over larger portions of graphical data with minimal processor overhead. Under given conditions, a process using page flushes may be faster and more efficient than incurring the overhead of breaking a shared region into lines.

Alternatively, a CPU instruction is contemplated which efficiently processes a given memory region by taking a memory range as a parameter and ensuring all data in the range is cache coherent.

Once the optimally shared memory was made coherent by a process as described above, the data in the optimally shared memory could be worked on by the graphics processor as if it were using an uncached or Write-Combine page cache attribute.

After using the surface and the data in the optimally shared memory for a period of time, the graphics processor may hand off the shared memory back to the CPU. According to embodiments of the invention, during a transitional phase of the hand-off back to the CPU, a surface or sub-area which had been previously worked on by the graphics processor while the shared memory was in the graphics-optimized view may be synchronized with respect to the graphics processor, including completing any pending rendering commands that are active or queued to be rasterized on the surface. Additionally, the graphics driver may track pending rasterization of these render commands and flush the render cache to ensure the surface is coherent.

Figure 9B:
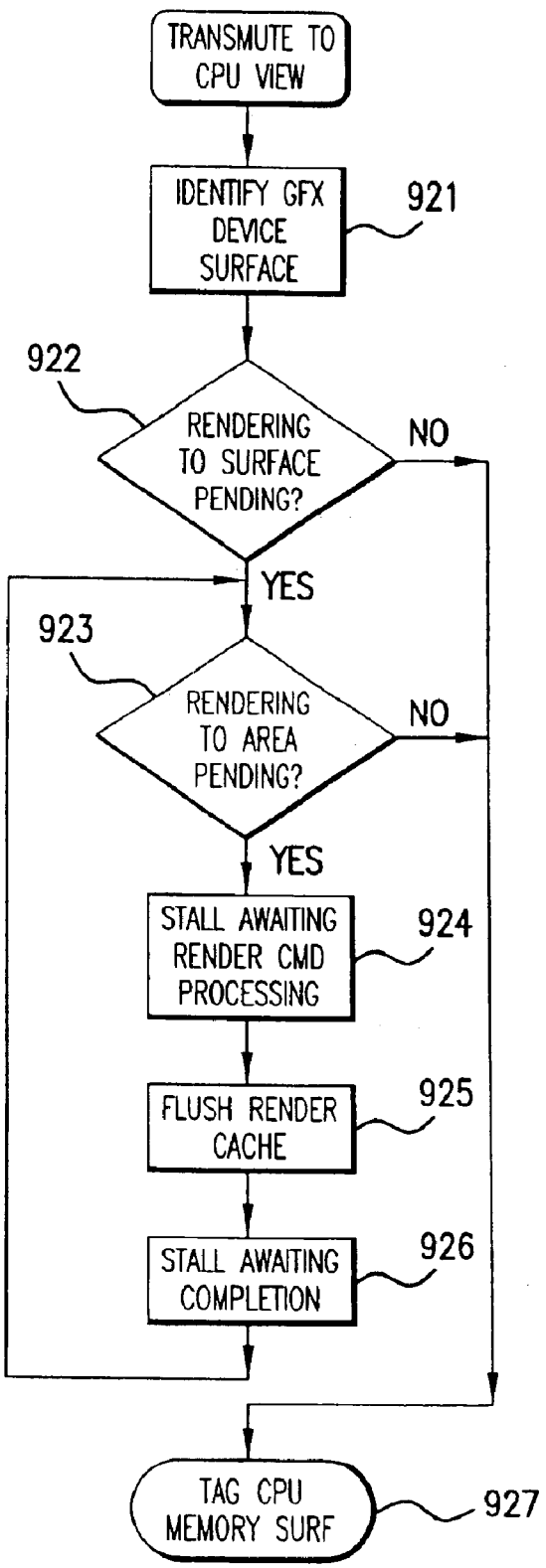
FIG. 9B shows a flow diagram for completing pending rendering operations on a graphics surface and changing the caching attribute of the surface according to the embodiment of FIG. 8.

FIG. 9B is a flow diagram illustrating one possible embodiment of a method for implementing the foregoing.

As shown in block 921, a surface that had previously been used by the graphics processor may be identified as having pending operations associated with it. These pending operations may be indicated by descriptors and members within the Surface-Object that were previously set when graphics operations on the surface were initiated. Then, as shown in block 922, it may be determined whether the output of any rendering to the surface is still pending, in which case the surface must be made coherent with respect to the graphics processor before it can be handed back to the CPU. If the result of the determination of block 922 were negative, no further processing would be needed. The flow could progress to block 927, wherein the memory type descriptor of the Surface-Object would be tagged, indicating that the surface is now optimally in the view of the CPU and applications.

On the other hand, if rendering to the surface were pending, indicating that there are surface pixels that are as yet not completely rendered and data as yet not written out to memory, the flow may progress to block 923. In block 923, it may be determined whether rendering to any sub-area within the surface is pending, using private data accumulated by the graphics driver and in members or descriptors of the Surface-Object. If no rendering is pending, the flow may progress to block 927

If the result of the determination of block 923 is affirmative, on the other hand, the flow may progress to block 924. In block 924 any rendering commands that apply to the surface being handed off which are still pending in the graphics processor will be processed. This includes both commands which will render to the optimally shared surface, as well as those which will render to unrelated surfaces, but where pixels in the optimally shared surface are used to produce a result going to an unrelated surface.

The flow may then progress to block 925, wherein the result of the execution of the previously identified render commands, i.e., rendered pixels, is flushed from any internal rendering queues in order to ensure the surface is coherent with respect to the graphics processor. The flow may continue to block 926 wherein a continued iteration of blocks 923–926 may be stalled until it is assured that the rendered commands and rendering output has fully completed. Blocks 923-926 may be successively repeated until there is no relevant rendering output remaining. At that time, flow may progress to block 927.

According to embodiments to the invention, the conversion of the optimally shared memory to have the caching attribute favorable to the CPU may occur within the Lock API or semantically equivalent interface, while the conversion of the optimally shared memory to have the attribute favorable to the graphics processor may occur within the Unlock API or semantically equivalent interface. In embodiments, the Lock and Unlock APIs may be executed at the graphics device driver level. However, embodiments of the invention are not limited to performing the conversion within the Lock and Unlock APIs. For example similar interface APIs are known such as BeginAccess and EndAccess APIs which indicate semantically equivalent action of negotiating beginning and ending of access in facilitating shared ownership. The conversion could be performed in various other levels of code such as within other interfaces, and within internal memory management and other activities.

More generally, it is noted that the programming structures disclosed herein, such as the process flows illustrated, the APIs and cache control primitives identified are arbitrary and merely representative of functionality which could be implemented in a wide variety of computer instruction sequences invoked by arbitrarily-assigned mnemonics.

Implementations of the present invention may be tangibly embodied as computer-executable instructions that may be stored and transported on a computer-usable medium such as a diskette, magnetic tape, disk or CD-ROM. The instructions could be implemented, for example, in a graphics device driver. The instructions may be downloaded via a suitable reading device to a computer memory from which they may be fetched and executed by a processor to effect the advantageous features of the invention.

Embodiments of the invention may be advantageous in a number of applications. For example, MPEG (Moving Pictures Expert Group Port[3]) applications generate "key frames" which are stored in memory and subsequently read back by the CPU to generate interpolated intermediate frames based on the key frames. By enabling the key frames to be stored in a shared memory which is substantially optimal for reading back by the CPU, while avoiding the aliasing, snoop cycles and the like of previous approaches, the performance of MPEG applications can be substantially improved.

[3] See, e.g.: 1. ISO/IEC 11172-1/2/3 (Parts 1:System/2:Video/3:Audio): Coding of moving pictures and associated audio for digital storage media at up to about 1.5 MBits/s; and 2. ISO/IEC 13818-1/2/3 (Parts 1:System/2:Video/3:Audio):Generic coding of moving pictures and associated audio information Another application of the invention could involve 3D applications. In such applications, vertex buffers are typically created. A vertex buffer is a buffer filled with points or vertices for a polygon; the vertices could be indexed. After being created by an application, a vertex buffer would typically be handed off to the graphics processor to be rendered. The application would also need to read back the data in the vertex buffer in order to detect, for example, whether graphical objects would "collide" with each other. Or, for example, the application might need to modify the vertices in order to manipulate a graphical object in order to cause it to "morph" or bend or the like.

According to embodiments of the present invention, the vertex buffer could be created with a shared memory type. The vertex buffer would then have a format making it possible to efficiently access the buffer both from a CPU view (for reading back vertex data by the application) and from a graphics view (for performing rendering operations on the vertex data).

Another useful application of the invention is in graphics "transform and lighting" operations in a traditional 3D pipeline, or for the complex vertex manipulation in modern "programmable Vertex Shaders". In both examples the application may create a buffer of geometry including vertices of an object to be rendered. These vertices describe polygons which need to be transformed and lit from the "world space" in which the model was created in to a view space which can be rendered onto the screen together with other objects. In this process, the vertices may need to be manipulated involving read, modify and writing the vertex data.

Some computer chipsets include specialized graphics hardware for performing transform and lighting applications. Alternatively, part of the CPU's specialized instruction set may be used to accelerate the transform and lighting.

In the latter case, processor manufacturers, provide a portion of the CPU's pipeline as a "processor-specific graphics pipeline" (PSGP) for software vendors to utilize for graphics chipsets that do not include specialized transform and lighting hardware. The PSGP pipeline uses the host CPU to perform transform and lighting operations, and vertex data which has been transformed and light accordingly is subsequently passed to the graphics processor for use in rendering.

During the period of time that the CPU is performing transform and lighting operations, it is most efficient if they can be performed in cached mode. If "clipping" is entailed, the data may need to be read back by the CPU and be manipulated. Because this requires reading the data from a memory buffer, manipulating it and writing it back to the buffer, these manipulations may be optimally performed when the memory is in cached mode. Additionally if the operation to be performed on the vertex is programmatically complex as is obviously possible from a fully programmable Vertex Shader. Processing one vertex may involve many reads and writes of each vertex as well as many other vertices, in order to achieve complex effects such as object-surface displacement mapping and environmental lighting effects.

Since, according to the invention, the shared memory is substantially optimally formatted for either view, transform and lighting operations could be performed very efficiently; no buffer or data aliasing is required.

Another possible application of the present invention could involve implementation of an API for graphics that can perform advanced rendering that may not necessarily be directly supported by hardware. Certain portions of the rendering exposed by the API may be "hardware acceleratable" (capable of being performed by the graphics processor) and some may not. It may improve efficiency to have the operations that are acceleratable done on the graphics processor in parallel as much as possible with CPU operation. This is particularly true for trivial rendering operations within a rendering process, such as Move, Fill, or Integer and Boolean operations which, if done by the graphics processor, will leave the CPU free to generate the next vertices of the complex shape such as bezier curves, or performing complex rasterization stages of the rendering effect.

Several embodiments of the present invention are specifically illustrated and described herein. However, it will be appreciated that modifications and variations of the present invention are covered by the above teachings and within the purview of the appended claims without departing from the spirit and intended scope of the invention.

The invention claimed is:

1. A method comprising:
allocating a memory region for sharing between a CPU and a graphics processor;
assigning said shared memory region a caching attribute favorable to an operating efficiency of said CPU;
performing a transition from a first mode wherein said CPU is using said memory region to a second mode wherein said graphics processor is using said memory region; and
during said transition from said first mode to said second mode, changing said caching attribute to one favorable to an operating efficiency of said graphics processor.

2. The method of claim 1, wherein said attribute favorable to an operating efficiency of said CPU is a cached attribute.

3. The method of claim 1, wherein said attribute favorable to an operating efficiency of said graphics processor is an uncached attribute.

4. The method of claim 1, wherein during said transition from said first mode to said second mode, said shared memory is made coherent.

5. The method of claim 1, performing a transition from said second mode back to said first mode, and during said transition from said second mode to said first mode, changing said attribute back to one favorable to an operating efficiency of said CPU.

6. The method of claim 1, wherein said shared memory region is allocated for a graphics surface.

7. The method of claim 6, wherein an application being executed by said CPU performs operations on data in a bounded area of said graphics surface.

8. The method of claim 7, wherein during said transition from said first mode to said second mode, a determination is made as to what granularity of cache flush is to be used to make said bounded area coherent.

9. The method of claim 8, wherein said granularity is one of a cache line, a cache page, and an entire cache.

10. A method comprising:
   (a) allocating a memory region for sharing between a CPU and a graphics processor;
   (b) using said shared memory in a first mode favorable to an operating efficiency of said CPU; and
   (c) using said shared memory in a second mode favorable to an operating efficiency of said graphics processor.

11. The method of claim 10, further comprising:
   between (b) and (c), making data in said shared memory region coherent.

12. The method of claim 11, wherein said shared memory region is made coherent in units of at most a length of a cache line.

13. The method of claim 11, wherein said shared memory is made coherent in units of at most a page.

14. A method comprising:
   allocating a memory region for shared usage by a CPU and a graphics processor;
   assigning said memory region one of two alternative attributes, said two alternative attributes being favorable, respectively, to either a performance of said CPU or a performance of said graphics processor;
   accessing said memory region using either said CPU or said graphics processor while said memory region has the corresponding favorable attribute; and
   changing said assigned attribute to the alternative attribute when usage of said memory region changes between said CPU and said graphics processor.

15. The method of claim 14, wherein said two alternative attributes are a cached attribute for the CPU, and an uncached attribute for the graphics processor.

16. A method comprising:
   allocating a memory region for shared usage by a CPU and a graphics processor;
   assigning said memory region a cached attribute;
   accessing said shared memory region using said CPU;
   making said shared memory region coherent; and
   handing off said shared memory region for usage by said graphics processor.

17. The method of claim 16, wherein said shared memory region is made coherent in units of at most a length of a cache line.

18. A method comprising:
   allocating a memory region for sharing between a CPU and a graphics processor;
   assigning a cached attribute to said memory region;
   executing an application on said CPU which reads, modifies or writes data in said shared memory region;
   making said shared memory region coherent;
   changing said attribute to an uncached attribute; and
   handing off said shared memory region to a graphics processor for rendering of said data.

19. The method of claim 18, further comprising:
   performing rendering operations on said data with said graphics processor;
   changing said attribute back to a cached attribute; and
   handing off said shared memory region back to said CPU for further processing.

20. The method of claim 18, wherein said memory region is a graphics surface.

21. A system comprising:
   a CPU;
   a graphics processor;
   a memory region shared between said CPU and graphics processor; and
   computer-executable instructions for changing a caching attribute of said memory region depending on which of said CPU or said graphics processor is using said memory region.

22. The system of claim 21, wherein said instructions are included in graphics driver software.

23. The system of claim 21, wherein said graphics processor is integrated into a chipset including said CPU.

24. The system of claim 21, wherein said graphics processor is included in a separate add-in card.

25. A program product tangibly embodied in a computer-usable medium, comprising computer-executable instructions for changing an attribute of a memory region shared between a CPU and a graphics processor depending on which of said CPU or said graphics processor is using said memory region.

26. The program product of claim 25, wherein said instructions cause said memory region to be made coherent during a transition from usage of said region by said CPU to usage of said region by said graphics processor.

27. The program product of claim 26, wherein during said transition, a determination is made as to what granularity of cache flush is to be used to make said region coherent.

28. A computer-usable medium storing computer-executable instructions, said instructions when executed by a processor implementing a process comprising:
   allocating a memory region for sharing between a CPU and a graphics processor;
   assigning said shared memory region an attribute favorable to an operating efficiency of said CPU;
   performing a transition from a first mode wherein said CPU is using said memory region to a second mode wherein said graphics processor is using said memory region; and
   during said transition from said first mode to said second mode, changing said attribute to one favorable to an operating efficiency of said graphics processor.

29. The computer-usable medium of claim 28, wherein said attribute favorable to an operating efficiency of said CPU is a cached attribute.

30. The computer-usable medium of claim 28, wherein said attribute favorable to an operating efficiency of said graphics processor is an uncached attribute.

31. A method comprising:
   allocating a memory region for sharing between a CPU and a graphics processor;
   assigning said shared memory region a cached attribute;
   performing a transition from a first mode wherein said CPU is using said memory region to a second mode wherein said graphics processor is using said memory region; and
   in said second mode, causing said graphics processor to treat said shared memory region as though it were uncached.

32. The method of claim 31, wherein during said transition from said first mode to said second mode, said shared memory is made coherent.

33. A method comprising:
allocating a memory region for sharing between a CPU and a graphics processor;
assigning said memory region a cached attribute;
executing an application on said CPU which reads, modifies or writes data in said shared memory region;
making said shared memory region coherent;
handing off said shared memory region to a graphics processor for rendering of said data; and
causing said graphics processor to treat said shared memory region as though it were uncached.

34. The method of claim 33, further comprising:
performing rendering operations on said data with said graphics processor;
handing off said shared memory region back to said CPU for further processing.

35. The method of claim 33, wherein said memory region is a graphics surface.

36. A computer-usable medium storing computer-executable instructions, said instructions when executed by a processor implementing a process comprising:
allocating a memory region for sharing between a CPU and a graphics processor;
assigning said shared memory region a cached attribute;
performing a transition from a first mode wherein said CPU is using said memory region to a second mode wherein said graphics processor is using said memory region; and
in said second mode, causing said graphics processor to treat said shared memory region as though it were uncached.

37. The computer-usable medium of claim 36, wherein during said transition from said first mode to said second mode, said shared memory is made coherent.

38. A computer-usable medium storing computer-executable instructions, said instructions when executed by a processor implementing a process comprising:
allocating a memory region for sharing between a CPU and a graphics processor;
assigning said memory region a cached attribute;
executing an application on said CPU which reads, modifies or writes data in said shared memory region;
making said shared memory region coherent;
handing off said shared memory region to a graphics processor for rendering of said data; and
causing said graphics processor to treat said shared memory region as though it were uncached.

39. The computer-usable medium of claim 38, said process further comprising:
performing rendering operations on said data with said graphics processor;
handing off said shared memory region back to said CPU for further processing.

40. The computer-usable medium of claim 38, wherein said memory region is a graphics surface.

* * * * *